US011384888B2

(12) United States Patent
Elliott

(10) Patent No.: US 11,384,888 B2
(45) Date of Patent: Jul. 12, 2022

(54) TRENCH-LESS PLUG ASSEMBLY

(71) Applicant: Brandon Lee Elliott, Richmond, TX (US)

(72) Inventor: Brandon Lee Elliott, Richmond, TX (US)

( * ) Notice: Subject to any disclaimer, the term of this patent is extended or adjusted under 35 U.S.C. 154(b) by 0 days.

(21) Appl. No.: 17/206,070

(22) Filed: Mar. 18, 2021

(65) Prior Publication Data

US 2021/0293365 A1 Sep. 23, 2021

Related U.S. Application Data

(60) Provisional application No. 62/993,641, filed on Mar. 23, 2020.

(51) Int. Cl.

*F16L 55/11* (2006.01)
*F16K 31/46* (2006.01)
*F16L 55/07* (2006.01)
*F16L 55/105* (2006.01)
*E03B 9/10* (2006.01)

(52) U.S. Cl.

CPC .......... *F16L 55/1108* (2013.01); *F16K 31/46* (2013.01); *E03B 9/10* (2013.01); *F16L 55/07* (2013.01); *F16L 55/105* (2013.01)

(58) Field of Classification Search

CPC ................................................ Y10T 137/9247
USPC .......................... 220/236, 288, 290; 251/216
See application file for complete search history.

(56) References Cited

U.S. PATENT DOCUMENTS 63,126 A * 3/1867 Wilcox ..................... F16K 1/04 4/292
1,486,707 A * 3/1924 Warner ..................... E03B 9/10 285/298
1,785,475 A * 12/1930 Bliven ...................... F16K 1/04 137/364
1,830,132 A * 11/1931 Quinn ....................... F16K 1/02 137/625.33
2,186,431 A * 1/1940 Riley ........................ E03B 9/10 220/8
2,298,551 A * 10/1942 Davisson ................ E03F 5/042 137/247.13
4,264,053 A * 4/1981 Carlson ................... F16K 1/482 251/264
4,632,359 A * 12/1986 Tooth ...................... F16K 47/02 181/269

(Continued)

*Primary Examiner* — Robert K Arundale
*Assistant Examiner* — Richard K. Durden
(74) *Attorney, Agent, or Firm* — Charles Knobloch

(57) ABSTRACT

A trench-less plug assembly having a fluid release element, further including: a top retaining ring, a bottom retaining ring, a plurality of rods vertically connecting the top retaining ring to the bottom retaining ring. A retaining plug is adapted to traverse vertically along the plurality of rods, and a main fitting adapted for receiving the bottom retaining ring. A gasket is disposed between the main fitting and the retaining plug. The plurality of rods engage the retaining plug with threads, whereby the retaining plug is positioned vertically between the top retaining ring and the bottom retaining ring by rotational movement of the retaining plug. The main fitting is adapted to attach to a main pipeline, and the main fitting is adapted to receive a riser enclosing the fluid release element. In one example, the main fitting attaches to a main pipeline using a saddle.

2 Claims, 4 Drawing Sheets

113 111 110 112 116 114 115 100 121 120 122 123 130 142 141 143 140 146 144

(56) References Cited

U.S. PATENT DOCUMENTS

| | | | | |
|---|---|---|---|---|
| 5,957,154 | A * | 9/1999 | Olaker | E03B 9/02<br>220/284 |
| 7,296,589 | B2 * | 11/2007 | Durkee | F16K 31/46<br>137/359 |
| 2015/0013790 | A1 * | 1/2015 | Hoff | F16K 27/02<br>137/553 |
| 2016/0258140 | A1 * | 9/2016 | Roell | E03B 9/08 |

* cited by examiner

TRENCH-LESS PLUG ASSEMBLY

CROSS REFERENCE TO RELATED APPLICATIONS

This application claims the benefit of U.S. Provisional Application No. 62/993,641 of filing date Mar. 23, 2020.

TECHNICAL FIELD

Disclosed herein is an apparatus for plugging a fluid release system in a buried pipe without requiring excavation to acquire access to the pipe, specifically for temporary fluid release systems for municipal water delivery pipes.

BACKGROUND OF THE INVENTION

Current industry practices for temporary fluid release systems require the installation of a hollow length of pipe affixed to a main pipeline bearing a cored hole for fluid liberation. The hollow pipe, also known as a riser or blow off, is arranged in such a manner so as to protrude from the ground surface and is accompanied by a valve attached to the top. Once the mainline is charged with fluid, the valve at the top of the riser is opened thus permitting the discharge of fluid from the mainline to the surface via the riser.

However a problem exists with the removal of such temporary risers. Current technology known to the inventor, is insufficient therefore requiring that the site be re-excavated in order to remove the riser from the mainline and plug the hole. This process wastes valuable time and labor on the order of one or two hours which additionally prevents the use of machine and manpower elsewhere, vis-a-vis opportunity cost.

The inventor has discovered and identified the problem and realizes that what is needed is a practical solution that enables the hole in the mainline to be sealed from the surface. Once installed, the device is accessible through the riser pipe and can be closed by use of an appropriate "key" that receives the shape on top of a plug (be it male or female). After it is closed and tested for leaks by activating the mainline the riser may be uninstalled and removed without the need to excavate. It is theoretically feasible to accomplish this task with one laborer within thirty minutes.

BRIEF DESCRIPTION OF THE SEVERAL DRAWINGS

DETAILED DESCRIPTION OF THE INVENTION

Figure 1:
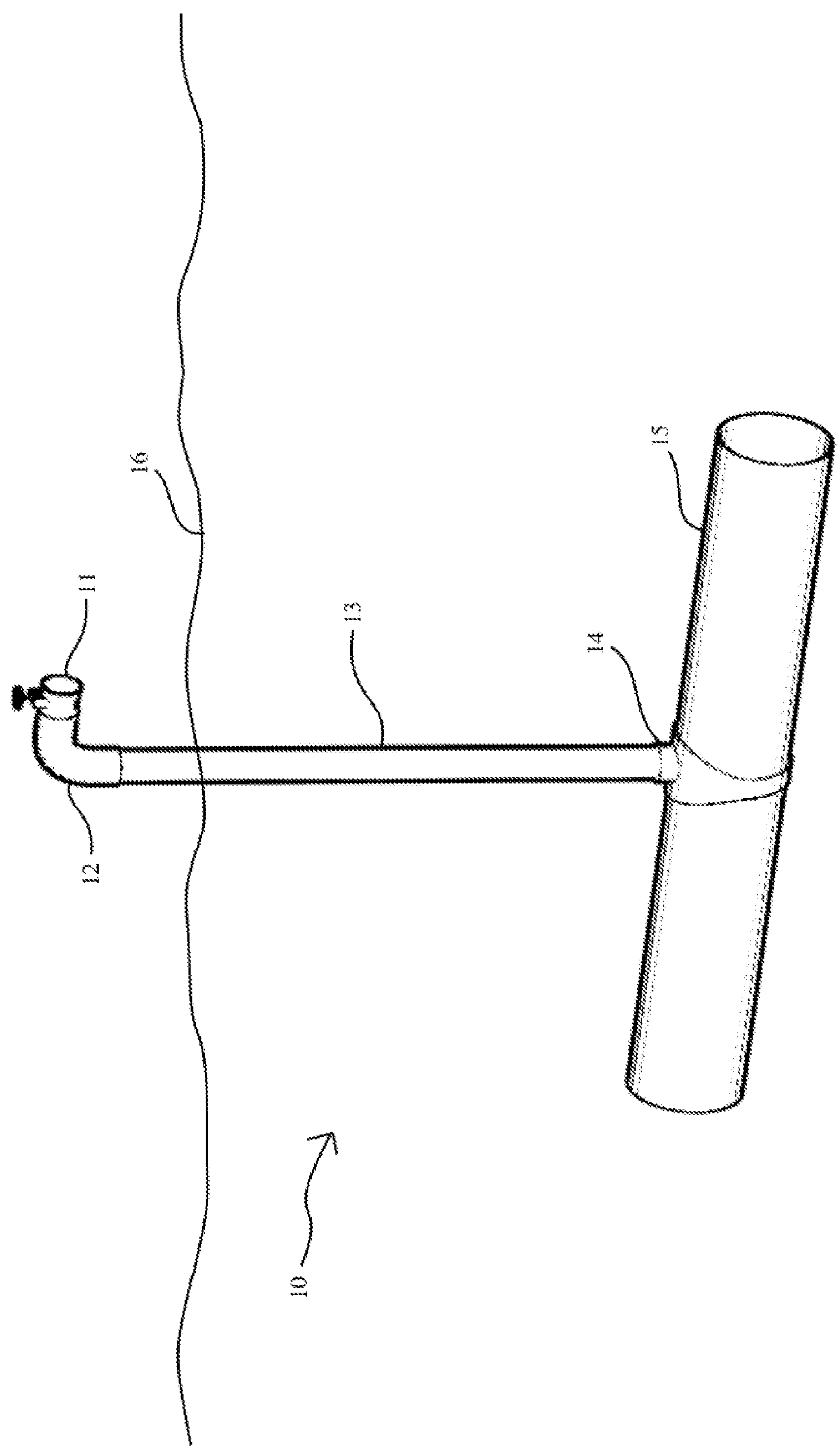
FIG. 1 is a perspective view of a fluid release system attached to a buried pipe.

In one example, the mechanism includes four (4) distinct pieces; The Main Body, Gasket, Plug, and Fluid Release Element.

In one example, the main body is centrally hollow at an appropriate diameter for nominal fluid flow. The wall thickness and material conforms to industry standards. The top portion is arranged in a manner such that the external wall is raised with a plurality of threads to accept a riser pipe of desired diameter. In one example, the top wall also contain a flat surface inside the outer raised wall that is inset at a suitable depth and also bears a hole of appropriate diameter for fluid release. In one example, at the top of the interior of the main body, a conical taper from the internal wall up to the release hole is employed to aid in smoother fluid liberation. The bottom of the main body is threaded in a manner as to fit within a pipe saddle of desired size.

In one example, the Fluid Release Element, there is a threaded ring at its base whose diameter fits within the raised and threaded walls of the Main Body. Protruding vertically from base is a sufficient number of threaded rods of an appropriate height. The rods are structurally sound and not so great in number as to significantly restrict fluid flow. On top of the threaded rods is a solid connecting ring for additional structural support and to hold the rods around the diameter of a retaining plug. The top ring also serves as a stopper or retainer for the plug as its internal diameter is slightly smaller than the internal diameter of the threaded rods. Thus its internal diameter is large enough to allow access to the top of the plug with a "key" but small enough so as to not permit accidental unthreading of the plug.

In one example of assembly, the plug is first installed into the bottom of the Fluid Release Element and threaded until it reaches the top and is stopped by the top ring. Next, the gasket which is made of an industry approved material, is placed on top of the Main Body within its threaded walls on the flat recessed surface. Following this, the Fluid Release Element, along with the previously affixed plug, is threaded down securely into the top of the Main Body. Once installed, the Fluid Release Element also serves to retain the gasket in a fixed position during operation.

In one example, the Main Body is constructed such that once the Fluid Release Element is in place there is enough remaining thread to receive the riser pipe. Additionally, the outer diameter of the rods of the Fluid Release Element outer diameter are a size such that it is smaller than the internal diameter of the riser pipe. The space is sufficient to allow for a minimally obstructed flow up and around the plug.

The device is now installed into the saddle on the mainline, then receives the riser pipe and the pit is now backfilled. Once the job is completed, the plug is accessed through the riser pipe by a "key" and threaded down into the closed position. The riser is now removed without the need for any excavation.

In one example, disclosed herein is a trenchless plug assembly that includes a fluid release element, a retaining plug, a gasket, and a main fitting. The fluid release element includes a top retaining ring, a bottom retaining ring, and a plurality of rods vertically connecting the top retaining ring to the bottom retaining ring. The retaining plug is adapted to traverse vertically along the plurality of rods. The main fitting is adapted for receiving the bottom retaining ring. The gasket is disposed between the main fitting and the retaining plug. The plurality of rods engage the retaining plug with threads, whereby the retaining plug is positioned vertically between the top retaining ring and the bottom retaining ring by rotational movement of the retaining plug. The main fitting is adapted to attach to a main pipeline. The main fitting is adapted to receive a riser enclosing the fluid release element.

FIG. 1 illustrates a perspective view of a fluid release system attached to a buried pipe. A blowoff assembly 10 is shown attached to a main pipeline 15 that is buried the surface 16 of the earth. Main pipeline 15 transports fluids from source to destination and acts as a barrier to shield fluids from the external environment. Ground surface 16 illustrates the topmost portion of the earth's soil and is part of the naturally existing environment. When affixed to main pipeline 15, the blowoff assembly 10 serves to release excess fluid (such as air, water, debris) from the main pipeline 15 above the ground surface 16. In some applications, blowoff assembly 10 is also used as an insertion point for appropriate cleaning chemicals for disinfection of main pipeline 15. In some applications, blowoff assembly 10 is also used as a point of fluid entry for hydrostatic pressure testing of the main pipeline 15.

Above ground surface 16, blowoff assembly 10 emerges and terminates with a valve 11. Valve 11 serves as a manual control for fluid release from blowoff assembly 10. In examples, valve 11 controls the flow rate of the fluid release by being set into a open, closed, or partially open position. By opening valve 11, fluids are expelled from blowoff assembly and main pipeline 15 into the open air above ground surface 16.

In the example as illustrated, a ninety-degree bend 12 is an elbow connected to valve 11 to redirect fluid flow from the riser pipe 13 of blowoff assembly 10. Elbow or bend 12 allows fluid passage to valve 11, redirecting fluid flow approximately horizontal to ground surface 16. In this example, elbow or bend 12 permits a 360-degree range of fluid flow control that is perpendicular to the vertical axis of the riser pipe 13. Vertically oriented riser pipe 13 transports fluids from the main pipeline (15) to the 90 Degree Bend (12).

Underground, a pipe saddle 14 connects the riser pipe 13 of blowoff assembly 10 to the main pipeline 15. Pipe saddle 14 provides a means to connect the riser pipe 13 by way of female threads (not shown). A hole is cored into main pipeline 15 (not shown) that receives riser pipe 13 (for example, by way of saddle 14), providing fluid communication for the fluids in main pipeline 15 into the blowoff assembly 10. Pipe saddle 14 seals the area on the surface of the main pipeline 15 immediately around the cored hole (not shown) in the main pipeline 15 by means of a gasket (not shown) to prevent fluid leakage. Pipe saddle 14 receives a male threaded plug (similar to plug 120 of FIGS. 3 and 4) after riser pipe (13) is removed, thus sealing the cored hole (not shown) permanently.

Figure 2:
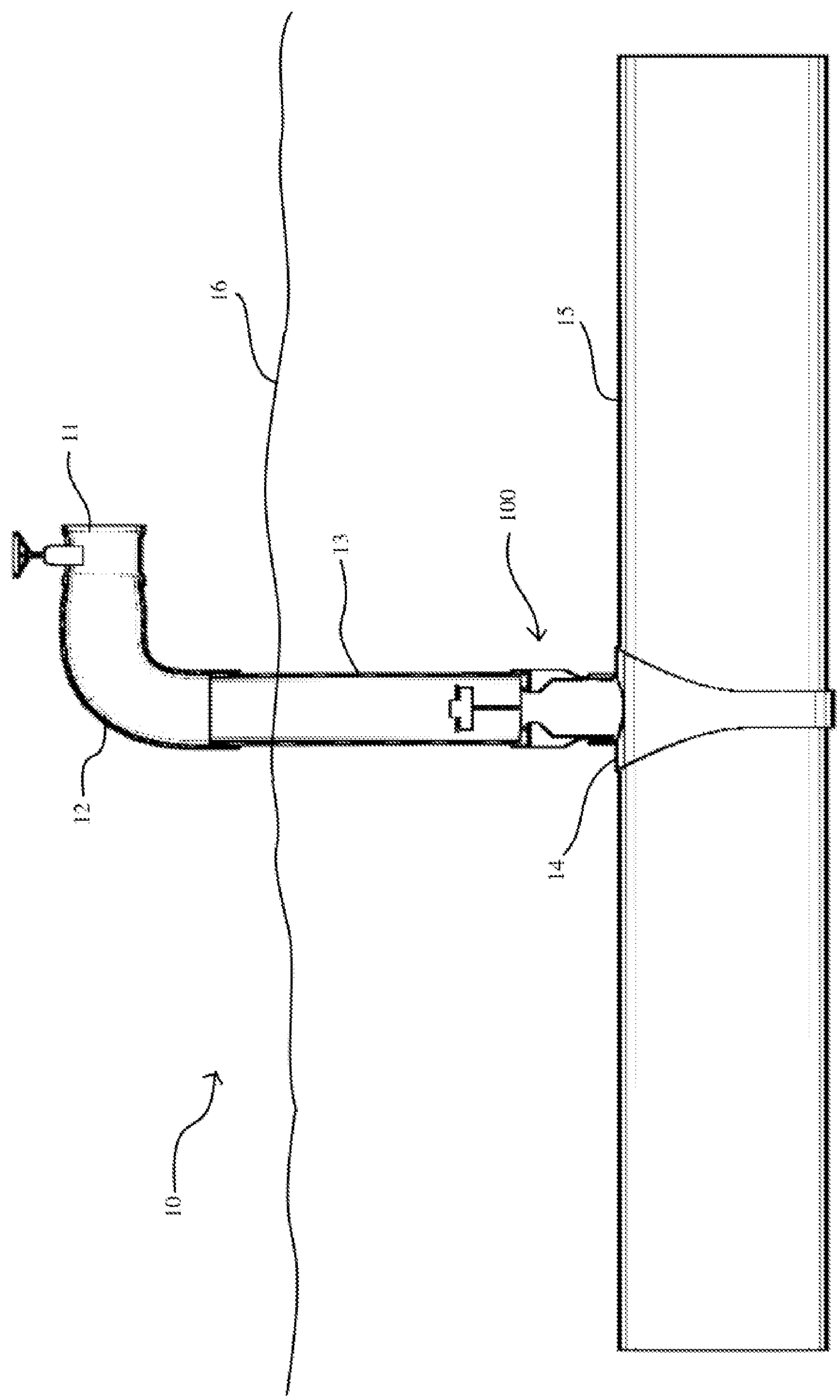
FIG. 2 is a side cross view, with cutaway cross section of riser pipe, illustrating the arrangement and positioning of the plug assembly apparatus.

FIG. 2 illustrates a side cross view, with cutaway cross section of riser pipe, illustrating the arrangement and positioning of the plug assembly apparatus. In this example, illustrated is the arrangement and positioning of the trench-less plug assembly 100 as an example of the present invention. Essentially, in this example, plug assembly is disposed between pipe saddle 14 of main pipeline 15 and blowoff assembly 10. In one example, plug assembly 100 is disposed into pipe saddle 14 that is affixed to main pipeline 15. The buried end of riser pipe 13 connects into plug assembly 100. In turn, one end elbow or bend 12 is attached to the other (above-surface) end of riser pipe 13. Valve 11 is attached to the other end of elbow or bend 12. Plug assembly 100 permits the attachment, positioning and arrangement of an in-place sealing device that can be controlled from the surface, without the need to trench down to pipe saddle 14. Plug assembly further serves to receive and hold riser pipe 13 in place.

Figure 3:
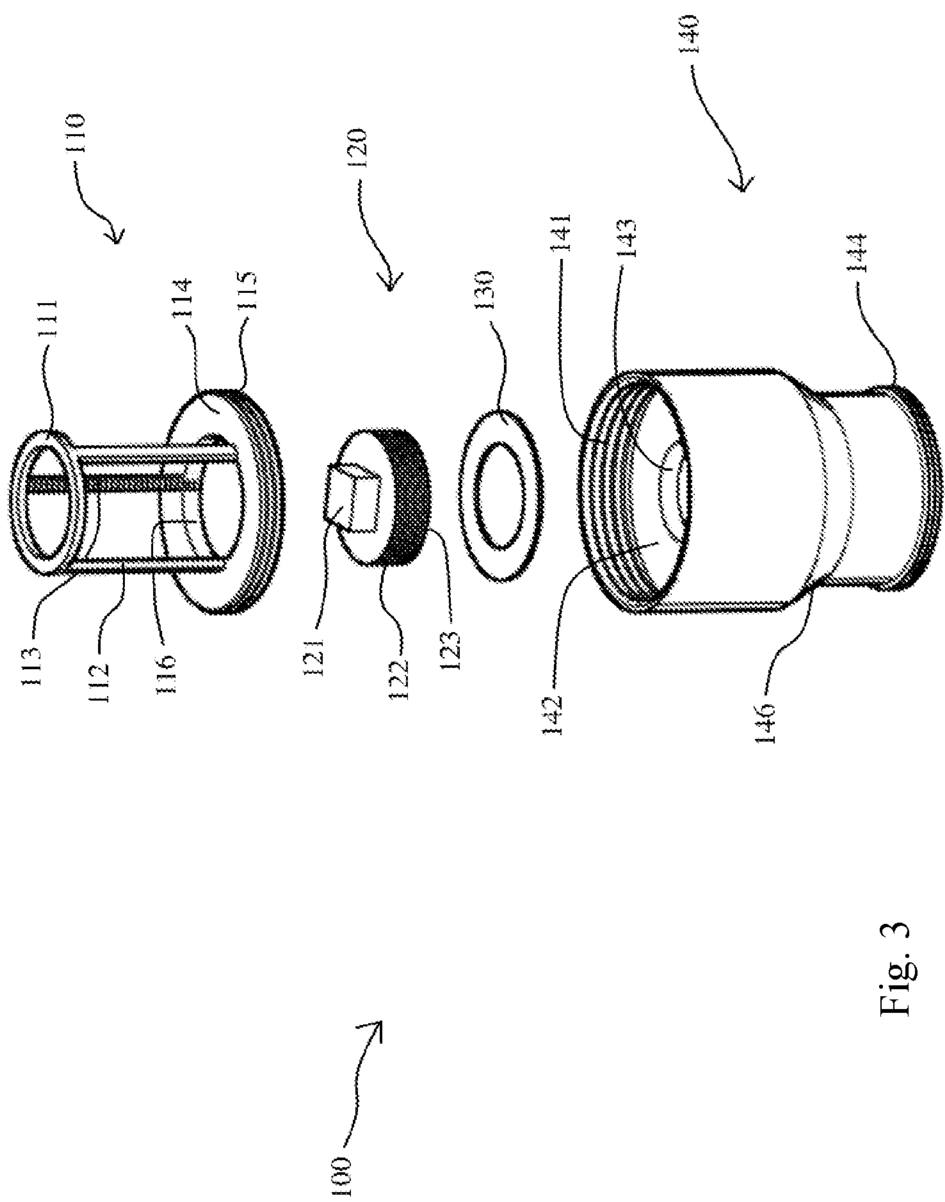
FIG. 3 is an exploded perspective view of the trench-less plug assembly.
Figure 4:
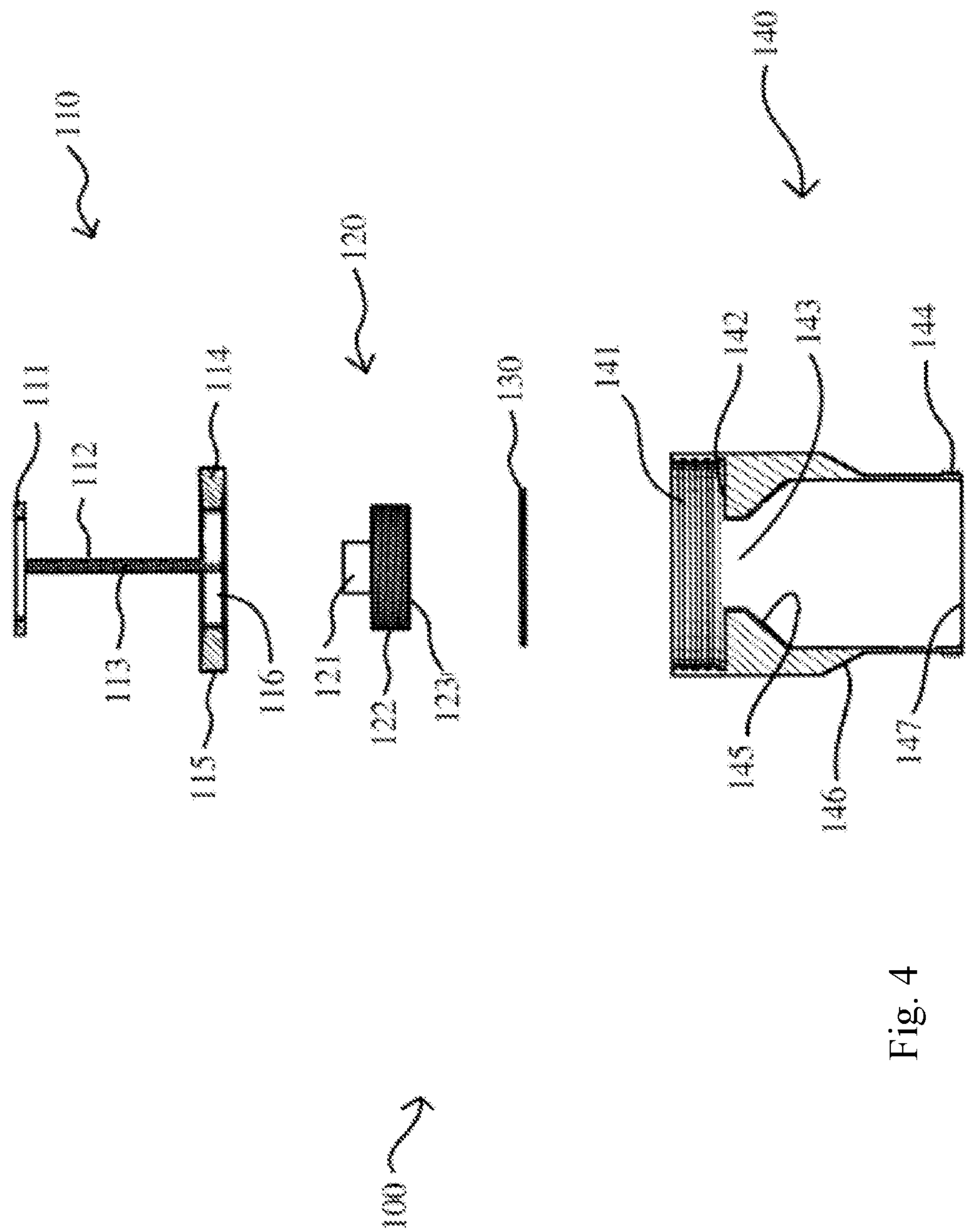
FIG. 4 is a facing cross section cut away view of the plug assembly apparatus, revealing positioning and arrangement of internal features and components.

As will be detailed in FIGS. 3 and 4 herein, in one example, plug assembly 100 permits the transmission of fluids into the riser pipe 13 when in an open position. In the closed position, plug assembly 100 provides a permanent seal of the cored hole (not shown, enclosed by saddle 14) on the main pipeline 15. In one example, by removing bend or elbow 12 and valve 11, the in-place sealing device (for example, plug 120 of FIGS. 3 and 4) is accessible from above the ground surface 16 through riser pipe 13.

FIG. 3 illustrates an exploded perspective view of an example of the trench-less plug assembly. In one example, trench-less plug assembly 100 is illustrated by four sub-assemblies: a fluid release element 110, a retaining plug 120, a gasket 130, and a main fitting 140. The bottom end of main fitting 140 attaches to the main pipeline 15 at saddle 14. The top end of main fitting 140 receives fluid release element 110 and riser pipe 13. An inner portion of main fitting 140 receives gasket 130 and retaining plug 120 through the top end of main fitting 140. Main fitting 140 has a passageway from the bottom to the top end to pass fluids therethrough. In this way, fluids are able to pass between a pipeline 15 to a riser 13 when not plugged.

In one example, main fitting 140 is an integrated piece configured similar to a threaded pipe coupling. In one example, the bottom end of main fitting 140 is a diameter to fit into the threaded coupling of saddle 14 and main pipeline 15. In one example, the top end of main fitting 140 is a diameter to receive the threaded end of riser 13. In one example, the diameter of main fitting 140 is ramped from a bottom end diameter to a top end diameter.

Starting with the attachment of the bottom of main fitting 140 to the main pipeline 15 at saddle 14, male threads 144 are disposed on the bottom end of main fitting 140, on the exterior surface. In this example, male threads 144 conform to the female threads of a receiving hole in the saddle 14 and main pipeline assemblage. Female threads 141 are disposed on the top end of main fitting 140 on the interior surface. In this example, female threads 141 conform to the male threads of, first fluid release element 110 and, second, male threads of riser 13. In one example, female threads 141 are the same conforming diameter for both fluid release element 110 and riser 13. In one example, threads 141 have respective conforming diameters for fluid release element 110 and riser 13 (not illustrated). In one example, threads 141 are two sets, one to receive male threads of riser 13 and one to receive female threads of fluid release element 110 (not illustrated). It can be appreciated, in other examples, that the pairing of male to female threads are reversed.

In one example, a ledge or seat 142 is disposed to receive a gasket 130, positioned inside main fitting 140 from the top end and below threads 141. A top hole 143 penetrates seat 142 and opens to the bottom side of main fitting 140. This enables or otherwise allows fluid passage through main fitting 140 and to the fluid release element 110.

In one example, the top diameter of main fitting 140 is larger than the bottom diameter. In one example, a ramp or flare 146 is expressed on the outer surface of main fitting 140, flaring outward from the bottom, between the bottom and top ends of main fitting 140. In one example, the cross sectional flow area for fluids passing through is increased above the gasket seat 142.

In one example of main fitting 140, the external shape of main fitting 140 is such that a prior art tool (not shown) can be employed to affix main fitting 140 to pipe saddle 14. In one example, as disclosed herein, main fitting 140 receives and holds the riser pipe 13. Other internal structural features and their functions are illustrated in FIG. 4.

Gasket seat 142 receives a gasket 130. In one example, gasket 130 provides a seal when compressed between plug base 123 and gasket seat 142. In one example, gasket 130 is a ringed design to allow for fluid passage when plug 120 is not sealing top hole 143.

Retaining plug 120 serves to stop flow of fluids through top hole 143. In one example, retaining plug 120 compresses gasket 130 against gasket seat 142, thus achieving a fluid tight seal. Retaining plug 120, therefore, ultimately covers the cored hole (not shown) that is struck into the main pipeline 15. Retaining plug 120 is circular in shape, so that it may be screwed up or down on a plurality of sets of threads. In one example, as illustrated, retaining plug 120 has the shape of a cylinder, with threads disposed on cylindrical surface of the plug.

In one example, retaining plug 120 has a plug head 121 that conforms to a manually operated "key" that allows a person on the surface to rotate the retaining plug 120, effecting an open, closed, or partially open position with respect to flow of fluids in or out of top hole 143. Plug head 121 is shaped to conform to the "key" and serves as an attachment point for the "key". In one example, plug head 121 is a square shape.

Plug male threads 122 are disposed the outer cylindrical surface of the retaining plug 120. Plug male threads 122 conform to threads on fluid release element 110, as will be shortly described in more detail.

In one example, the bottom surface of retaining plug 120 is a plug base 123 that is approximately flat, thus providing maximum surface area to contact gasket 130. Plug base 123 is shaped to compress gasket 130 when plug 120 is in the closed position to obtain a fluid tight seal.

In one example, fluid release element 110 holds retaining plug 120 into a fixed position above the cored hole (not illustrated) of the main pipeline 15, holding it above top hole 143 of main fitting 140. Fluid release element 110 allows for vertical translation of retaining plug 120 along the rods 112. In one example, in an open position, the retaining plug 120 rests against the retaining ring 111, thus permitting fluid passage. In a closed position, the retaining plug 120 is seated within the base ring 114, providing compression on the gasket 130 thus creating a fluid tight seal.

In one example, fluid release element 110 has three primary components: a base ring 114, risers or rods 112, and a top retaining ring 111. The base ring 114 is confirmed to thread into the top of main fitting 140. The risers or rods 112 attach at one end to base ring 114 and at the other end to top retaining ring 111. This creates an open stand-off between base ring 114 and top retaining ring 111. The risers or rods 112 enable a significant amount of open space so as to minimally obstruct the flow of fluids. The top retaining ring 111 also serves as a stop for the plug 120, such that plug 120 has a restricted vertical movement between main fitting 140 and retaining ring 111. This prevents plug 120 from coming free from the assembly and getting lost in the fluid flow.

Thus, top retaining ring 111 provides structural support to the rods 112 and prevents accidental removal of the plug 120 when the plug is accessed from the riser 13. In one example, an opening in retaining ring 111 provides access to plug head 121 for operation of plug 120 with use of an appropriately shaped "key" (not shown).

A plurality of risers or rods 112 vertically connect base 114 to ring 111, effecting a stand-off for receiving plug 120. In one example, as illustrated, three rods are spaced at 120 degree angles from each other. Female rod threads 113 are disposed on the interior portions of rods 112, conforming to receive the male threads 122 of plug 120. With this positioning and arrangement, plug 120 is screwed up or down the rods 112. In one example, female rod threads 113 match up with base ring female threads 116 of base ring 114, enabling plug 120 to continue to be screwed downward, into base ring 114.

As noted, the plurality of rods 112 serve also to support retaining ring 111 and their footprint in the path of fluid flow is minimal, permitting fluid passage between the empty spaces. The plurality of rods 112 serve as a guide to plug 120, guiding plug 120 vertically into open and closed positions.

The female rod threads 113, coupled with rods 112, support the plug 120 in a fixed position above the cored hole (not shown) of the main pipeline 15. Female rod threads 113 convert the rotational movement of the plug 120 into vertical movement that is guided by the rods 112.

Base ring 114 holds the ends of rods 112 and also has base ring female threads 116 on the interior of ring 114 and base ring male threads 115 on the exterior of ring 114. In one example, the outer diameter of base ring 114 is greater than the diameter created by the positioning of the plurality of rods 112 and top retaining ring 111. In one example, the outer diameter of base ring 114 is within the walls of riser pipe 13. This allows for the passing of fluids through the rods 112 around both the plug 120 (in an open position) and the retaining ring 111 but still within the walls of the riser pipe 13. The bottom portion of base ring 114 compresses gasket 130 onto gasket seat 142, thereby holding gasket 130 securely in place. In one example, base ring 114 serves as initial insertion point for installation of the plug 120.

Base ring male threads 115 are disposed on the exterior of cylindrical surface of base ring 114. Base ring male threads 115 conform to the female threads 141 of the fluid release element 110, thus marrying the fluid release element 110 with the main fitting 140. As attached, base ring male threads 115 secures the fluid release element 110 to the main fitting 140.

Base ring female threads 116 are disposed on the interior cylindrical surface of base ring 114. Base ring female threads 116 conform to and receive the plug male threads 122. The coupling of base ring female threads 116 to plug male threads 122 serves to secure plug 120 in the closed position. Base ring female threads 116 coupled with plug male threads 122 provide a means to tighten plug 120 onto gasket 130.

Plug male threads 122 join with base ring female threads 116 for the initial installation of the plug 120 into the fluid release element 110 and to later secure plug 120 against gasket 130. Coupled with rod female threads 113, rotational movement of plug 120 converts into vertical movement. Thus, plug 120 interlocks with rod female threads 116 to suspend plug 120 above the cored hole (not shown) in main pipeline 15, effecting an open position for fluid flow unless seated against gasket 130 and closing top hole 143.

FIG. 4 illustrates a facing cross section cut away view of the plug assembly apparatus, revealing positioning and arrangement of internal features and components. In one example, trenchless plug assembly 100 is illustrated by four sub-assemblies: a fluid release element 110, a retaining plug 120, a gasket 130, and a main fitting 140. The bottom end of main fitting 140 attaches to the main pipeline 15 at saddle 14. The top end of main fitting 140 receives fluid release element 110 and riser pipe 13. An inner portion of main fitting 140 receives gasket 130 and retaining plug 120 through the top end of main fitting 140. Main fitting 140 has a passageway from the bottom to the top end to pass fluids there through. In this way, fluids are able to pass between a pipeline 15 to a riser 13 when not plugged.

In this example, as illustrated, there are two rods 112 positioned and arranged 180 degrees from each other.

In this example, as illustrated, the interior structure of main fitting 140 is visible. At the bottom end of main fitting 140 is a bottom hole 147 that interfaces with the hole in the main pipeline 15, permitting fluid transmission from the main pipeline 15 into the interior passageway of main fitting 140. In one example, the cross sectional area of the interior passageway of main fitting 140 includes a conical taper surface 145 to direct fluids passing from the bottom hole 147 to the top hole 143. Conical taper surface 145 assists in maintaining laminar flow within main fitting 140.

In one example, flare 146 on the outer surface of main fitting 140 widens the main fitting 140 diameter at the top, relative to the bottom. Flare 146 permits installation of a riser pipe 13 with a larger internal diameter than that of the external diameter of the rods 112, retaining ring 111 and plug 120.

In one example, main fitting male threads 144 join the main fitting 140 to the pipe saddle 14, permanently securing main fitting 140 to the pipe saddle 14.

In one example, gasket seat 142 is a surface that provides a shelf to support gasket 130 for a fluid tight seal. Coupled with base ring 114, gasket seat 142 serves to secure the gasket 130 and acts as a compression area combined with the plug base 123 to compress gasket 130 and attain a fluid tight seal.

In one example, main fitting 140 bears the main fitting male threads 144, bears the main fitting female threads 141, includes a gasket seat 142, bears an external flare 146, receives and holds a riser pipe 13, and transfers fluid from the main pipeline 15 to the fluid release element 110. In one example, main fitting 140 also bears an internal conical taper 145. In one example, the outer surface of main fitting 140 is shaped to receive a prior art tool (not shown) to affix main fitting 140 to the pipe saddle 14.

Operation.

In one example of operation of the invention herein described, a main pipeline is to be buried with the usual pipe saddle and riser, but with the trench-less plug assembly of the present invention disposed between the riser and the pipe saddle/main pipeline. The retaining plug of the trench-less plug assembly initially is suspended on the rods of the fluid release element so that the trench-less plug assembly is in the open, fluid flow position. The main pipeline is buried, along with the riser, saddle, and trench-less plug assembly. At some time when it is desired to plug the hole in the main pipeline, the riser is entered from above the ground surface with a tool that embraces the retaining plug. The retaining plug is rotated, screwing the retaining plug downward to seat into the main fitting of the trenchless plug assembly, thus closing the hole in the main pipeline and stopping fluid flow. In one example, the riser is removed by unscrewing the riser from the trenchless plug assembly. In another example, the riser is cut off at or slightly below the surface of ground level and a low pressure release valve is attached. In this example, should the plug or the hole in the main pipeline fail, then the fluid leak will be readily visible from the surface of the ground—for instance, by a fountain spewing from the ground—for quick identification and location of the failed pipe or plug.

INDUSTRIAL APPLICABILITY

The application of the invention as herein described provides a more efficient way to service buried municipal pipelines, especially water pipes.

Conclusion

Although the present invention is described herein with reference to a specific preferred embodiment(s), many modifications and variations therein will readily occur to those with ordinary skill in the art. Accordingly, all such variations and modifications are included within the intended scope of the present invention as defined by the reference numerals used.

From the description contained herein, the features of any of the examples, especially as set forth in the claims, can be combined with each other in any meaningful manner to form further examples and/or embodiments.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to enable others skilled in the art to utilize the invention and such or other embodiments and with various modifications required by the particular applications or uses of the invention.

The invention claimed is:

1. A trench-less plug assembly comprising:

a fluid release element, further comprising:

a top retaining ring, a bottom retaining ring, a plurality of rods vertically connecting the top retaining ring to the bottom retaining ring;

a retaining plug adapted to traverse vertically along the plurality of rods, a main fitting adapted for receiving the bottom retaining ring;

a gasket disposed between the main fitting and the retaining plug, and wherein the plurality of rods engage the retaining plug with threads, whereby the retaining plug is positioned vertically between the top retaining ring and the bottom retaining ring by rotational movement of the retaining plug;

wherein the main fitting is adapted to attach to a main pipeline; and wherein the main fitting is adapted to receive a riser enclosing the fluid release element.

2. The trench-less plug assembly of claim 1 wherein the main fitting is adapted to attach to a main pipeline using a saddle that is attached to the main pipeline.

* * * * *